US009298601B2

(12) United States Patent
Hwang et al.

(10) Patent No.: US 9,298,601 B2
(45) Date of Patent: *Mar. 29, 2016

(54) CONDITIONAL PROCESSING METHOD AND APPARATUS

(71) Applicant: Samsung Electronics Co., Ltd., Gyeonggi-do (KR)

(72) Inventors: Seo Young Hwang, Gyeonggi-do (KR); Jae Yeon Song, Seoul (KR); Kook Heui Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/739,848

(22) Filed: Jun. 15, 2015

(65) Prior Publication Data

US 2015/0278083 A1  Oct. 1, 2015

Related U.S. Application Data

(63) Continuation of application No. 12/610,817, filed on Nov. 2, 2009, now Pat. No. 9,058,181.

(30) Foreign Application Priority Data

Oct. 31, 2008  (KR) .................. 10-2008-0107630

(51) Int. Cl.
  *G06F 17/22* (2006.01)
  *G06F 17/27* (2006.01)
  (Continued)

(52) U.S. Cl.
  CPC .............. *G06F 12/023* (2013.01); *G06F 8/427* (2013.01); *G06F 9/44505* (2013.01); *G06F 17/2247* (2013.01); *G06F 17/2705* (2013.01); *G06F 2212/251* (2013.01)

(58) Field of Classification Search
  CPC .. G06F 8/427; G06F 17/2705; G06F 17/2247
  See application file for complete search history.

(56) References Cited

U.S. PATENT DOCUMENTS

| 4,200,927 A | 4/1980 | Hughes et al. |
| 5,339,421 A | 8/1994 | Housel, III |

(Continued)

FOREIGN PATENT DOCUMENTS

| JP | 2003-018580 | 1/2003 |
| JP | 2006-195675 | 7/2006 |

(Continued)

OTHER PUBLICATIONS

Dailey et al., "A Self-Describing Data Transfer Methodology for its Applications", Research Report, Washington State Transportation Center (TRAC), Dec. 2000.

(Continued)

*Primary Examiner* — Patrice Winder
*Assistant Examiner* — Angela Widhalm de Rodriguez
(74) *Attorney, Agent, or Firm* — The Farrell Law Firm, P.C.

(57) ABSTRACT

A conditional processing method and apparatus for efficient memory management are provided. A conditional processing method includes receiving a data stream including a plurality of elements; decoding the received data stream; generating a parse tree by loading the decoded data stream; determining whether a parsingSwitch element is detected while generating the parse tree; and if the parsingSwitch element is detected, loading at least one child element of the detected parsingSwitch element in a memory, based on at least one attribute of the detected parsingSwitch element.

6 Claims, 5 Drawing Sheets

(51) Int. Cl.
*G06F 12/02* (2006.01)
*G06F 9/45* (2006.01)
*G06F 9/445* (2006.01)

(56) References Cited

U.S. PATENT DOCUMENTS

| | | | |
|---|---|---|---|
| 5,701,490 | A | 12/1997 | Safonov |
| 6,102,969 | A | 8/2000 | Christianson et al. |
| 6,314,558 | B1 | 11/2001 | Angel et al. |
| 6,584,480 | B1 | 6/2003 | Ferrel et al. |
| 6,772,413 | B2 | 8/2004 | Kuznetsov |
| 6,993,715 | B2 | 1/2006 | Deen et al. |
| 7,047,033 | B2 | 5/2006 | Wyler |
| 7,080,094 | B2 | 7/2006 | Dapp et al. |
| 7,302,383 | B2 | 11/2007 | Valles |
| 7,373,291 | B2 | 5/2008 | Garst |
| 7,373,597 | B2 | 5/2008 | Hagerty et al. |
| 7,408,927 | B2 | 8/2008 | George |
| 7,480,856 | B2 | 1/2009 | Jones |
| 7,496,667 | B2 | 2/2009 | Adam et al. |
| 7,548,926 | B2 | 6/2009 | Stern et al. |
| 7,581,170 | B2 | 8/2009 | Baumgartner et al. |
| 7,590,381 | B2 | 9/2009 | Zink et al. |
| 7,650,597 | B2 | 1/2010 | Bohlmann et al. |
| 7,703,009 | B2 | 4/2010 | Huang et al. |
| 7,720,835 | B2 | 5/2010 | Ward et al. |
| 7,730,396 | B2 | 6/2010 | Chidlovskii et al. |
| 7,774,692 | B2 | 8/2010 | Hirose et al. |
| 7,818,666 | B2 | 10/2010 | Dorsett et al. |
| 7,933,928 | B2 | 4/2011 | Chandrasekar et al. |
| 8,209,605 | B2 | 6/2012 | Poston et al. |
| 8,239,626 | B2 | 8/2012 | Koseki |
| 2002/0010714 | A1 | 1/2002 | Hetherington |
| 2002/0023113 | A1 | 2/2002 | Hsing et al. |
| 2003/0001948 | A1 | 1/2003 | Mochizuki |
| 2004/0221319 | A1 | 11/2004 | Zenoni |
| 2005/0022115 | A1 | 1/2005 | Baumgartner et al. |
| 2005/0102652 | A1 | 5/2005 | Sulm et al. |
| 2005/0188350 | A1 | 8/2005 | Bent et al. |
| 2006/0031555 | A1 | 2/2006 | Sikdar et al. |
| 2006/0235811 | A1 | 10/2006 | Fairweather |
| 2007/0003166 | A1 | 1/2007 | Berkner |
| 2008/0187004 | A1 | 8/2008 | Johnson |
| 2009/0184970 | A1 | 7/2009 | Joung et al. |
| 2011/0173397 | A1 | 7/2011 | Boyle et al. |

FOREIGN PATENT DOCUMENTS

| | | |
|---|---|---|
| JP | 2007-012074 | 1/2007 |
| JP | 2009-543507 | 12/2009 |

OTHER PUBLICATIONS

Seo-Young Hwang et al., "Study Text for CD of 14496-20 AMD2", International Organisation for Standardisation, ISO/IEC JTC1/SC29/WG11, Coding of Moving Pictures and Audio, Oct. 13, 2008.

Anonymous: "Study Text of ISO/EC 14496-20 LASeR/PDAM2 (Adaptation)", International Organisation for Standardisation, ISO/IEC JTC 1/SC 29/WG 11, Coding of Moving Pictures and Audio, Oct. 13, 2008.

Australian Examination Report dated Nov. 20, 2014 issued in counterpart application No. 2009310547.

CONDITIONAL PROCESSING METHOD AND APPARATUS

PRIORITY

This application is a continuation of U.S. application Ser. No. 12/610,817, which was filed in the U.S. Patent and Trademark Office on Nov. 2, 2009, and claims priority under 35 USC §119(a) to Korean Application Serial No. 10-2008-0107630, which was filed Korean Intellectual Property Office on Oct. 31, 2008, the entire content of each of which is incorporated herein by reference.

BACKGROUND OF THE INVENTION

1. Field of the Invention

The present invention relates generally to data processing and, in particular, to a conditional processing method and apparatus for efficient memory management.

2. Description of the Related Art

Description languages can be classified into imperative and declarative description languages. The imperative description languages focus on 'how to' obtain a goal so as to explicitly specify an algorithm to achieve the goal. Imperative description languages include Fortran, C, Java, etc.

In contrast, declarative description languages focus on 'what' should be done so as to explicitly specify the goal and leave the implementation to the algorithm. When programming with Hyper Text Markup Language (HTML) as a representative declarative description language, what is to be presented by an HTML view, i.e. browser, is declared and thus a procedural algorithm of the browser converts what to be presented to pixels to be displayed on a screen. The representative declarative description languages include Extensible Stylesheet Language Transformations (XSLT), Structured Query Language (SQL), Scalable Vector Graphics (SVG) based on Extensible Markup Language (XML), and Lightweight Application Scene Representation (LASeR).

LASeR is an International standard developed to provide users with enriched content services through free presentation and user interaction using diverse multimedia elements such as scene description, video, audio, image, font, text, metadata, and script, with the development of the communication and broadcast technologies.

Conditional processing is a service control method for determining validity of a result, whether to provide a service or not, and execution time of information through the evaluation on a given expression. In the declarative description language, the conditional processing includes a logical declaration written with a declarative description language determined as a conditional processing function such that the validity of the information, whether to provide the service, and execution time of the information are described determinatively.

FIG. 1 is a flowchart illustrating a procedure of a conditional processing at a UE of received data with a conventional declarative description language.

Referring to FIG. 1, a data stream is received and an elementary stream is allocated to a decoding buffer in step 100. The UE decodes the data stream in step 110. The decoded elementary stream is loaded in a configuration memory in step 120. The elementary stream loaded in the configuration memory, i.e. the data component, is split into meaningful tokens. These tokens are analyzed in hierarchical relationship such that the data is structured as a predetermined parse tree in a sentence structure. All the elements are loaded in the configuration memory so as to be configured for execution. When there is an element executing the conditional processing function among the hierarchical elements of the parse tree in step 130, the UE loads all the child nodes targeted to be evaluated in step 140 and accesses the nodes on a one-by-one basis in step 150. That is, the UE performs conditional processing on all the child nodes on a one-by-one basis at step 150. The UE determines whether the conditional processing evaluate result is true in step 160 and, if it is true, outputs the result to a display.

In such conventional conditional processing, the conditional processing is performed after all the downward nodes (child nodes) are loaded in the configuration memory. When a child node evaluated as 'true' appears during the conditional processing, the conditional processing is terminated. The conventional conditional processing is designed such that the child nodes that are not displayed on the screen according to the evaluation result are maintained as loaded on the configuration memory. Accordingly, all the child nodes of a command node for conditional processing are loaded in the configuration memory so as to occupy large memory space. Therefore, even when only one child node is output as the result of the conditional processing, the rest of the child nodes, i.e. the nodes of which conditional processing evaluation result are 'false', maintain occupancy in the memory space.

That is, the execution of data structured with the conventional declarative description language is designed such that all decoded data is loaded in the configuration memory to be decomposed into a parse tree, whereby the conditional processing nodes are processed on a one-by-one basis along with other nodes in the same manner.

According to the recent technology trends, there will likely be a network model integrating different technologies such as Digital Video Broadcast-Convergence of Broadcasting and Mobile Service (DVB-CBMS) and Internet Protocol Television (IPTV) so as to integrally serve different types of devices. When a single network operator manages the wired and wireless networks integrally for providing IPTV service, the IPTV service can be provided to both the mobile and fixed devices. For instance, a broadcast service can be implemented such that a broadcast stream is transmitted to support various types of end user terminals different from each other in display size, memory size, capability, and other characteristics. This means that the same service can be provided through different devices including home digital TV and mobile phone. In line with this trend, various technologies for providing terminal-adaptive and situation-adaptive services are being proposed. In such an integrated network-based service environment, the aforementioned conditional processing method is likely to require a large memory space for accommodating the increased number of child nodes to be evaluated, However, terminals having relatively low capability will experience processing overload, resulting in a service failure. In addition to the network integration, the service integration increases the probability for a terminal to simultaneously receive various services, such that large memory occupancy of a specific application makes it difficult for the terminal to efficiently manage its resources for other services.

SUMMARY OF THE INVENTION

There is, therefore, a need for a conditional processing method and apparatus that enables an end user terminal to load only the data for provisioning the service, while processing received data, thereby reducing memory occupancy and thus improving memory management efficiency.

In order to overcome the problems of the prior art, the present invention provides a conditional processing method and apparatus that improves memory management efficiency of a terminal by loading only the data for provisioning the service, in the memory while parsing the received data structured with a declarative description language.

In accordance with an embodiment of the present invention, a conditional processing method includes receiving a data stream including a plurality of elements; decoding the received data stream; generating a parse tree by loading the decoded data stream; determining whether a parsingSwitch element is detected while generating the parse tree; and if the parsingSwitch element is detected, loading at least one child element of the detected parsingSwitch element in a memory, based on at least one attribute of the detected parsingSwitch element. When the at least one child element includes a plurality of child elements, loading the plurality of child elements includes listing the plurality of child elements of the parsingSwitch element in a decreasing order with respect to respective memory requirements of the plurality of child elements, when a mode attribute of the detected parsingSwitch element is decremental; and loading a first child element among the listed the plurality of child elements, when the first child element fulfills a current memory status in the memory.

In accordance with another embodiment of the present invention, a conditional processing apparatus includes a decoder that decodes a data stream including a plurality of elements; a configuration memory; and a processor that generates a parse tree by loading, in the configuration memory, the decoded data stream, determines whether a parsingSwitch element is detected, and loads at least one child element of a detected parsingSwitch element based on at least one attribute of the detected parsingSwitch element. When the at least one child element includes a plurality of child elements, the processor lists the plurality of child elements of the parsingSwitch element in a decreasing order with respect to memory requirements of the plurality of child elements, when a mode attribute of the detected parsingSwitch element is decremental, and the processor loads a first child element among the listed the plurality of child elements, when the first child element fulfills a current memory status in the configuration memory.

BRIEF DESCRIPTION OF THE DRAWINGS

The above and other objects, features, and advantages of the present invention will be more apparent from the following detailed description in conjunction with the accompanying drawings, in which.

DETAILED DESCRIPTION OF EMBODIMENTS OF THE INVENTION

Certain embodiments of the present invention are described in detail with reference to the accompanying drawings below. The same reference numbers are used throughout the drawings to refer to the same or like parts. Detailed descriptions of well-known functions and structures incorporated herein may be omitted to avoid obscuring the subject matter of the present invention. The terms and words used in this specification and claims shall not be understood as limited to the lexical meaning. Based on the principle that an inventor can adequately define terms to best describe his/her invention, the terms and words shall be interpreted as conforming to the technical spirit of the present invention. Accordingly, the examples and drawings disclosed in the specification are only exemplary ones and there may be various equivalents and modifications at the time of the application for patent of this invention.

In accurate with an embodiment of the present invention, a conditional processing method and apparatus for processing the data structured based on the declarative description language is proposed. Particularly, the conditional processing method and apparatus of the present invention enables a recipient terminal to load only the service data on its memory while performing conditional processing in a data parsing process for configuring the declarative description language-based data in the serviceable format so as to efficiently manage memory.

In an embodiment of the present invention, a structure of a parsing switch (parsingSwitch) node is defined as a node type for performing the conditional processing function in the data parsing and loading process and the evaluation information related to the parsingSwitch node.

Figure 1:
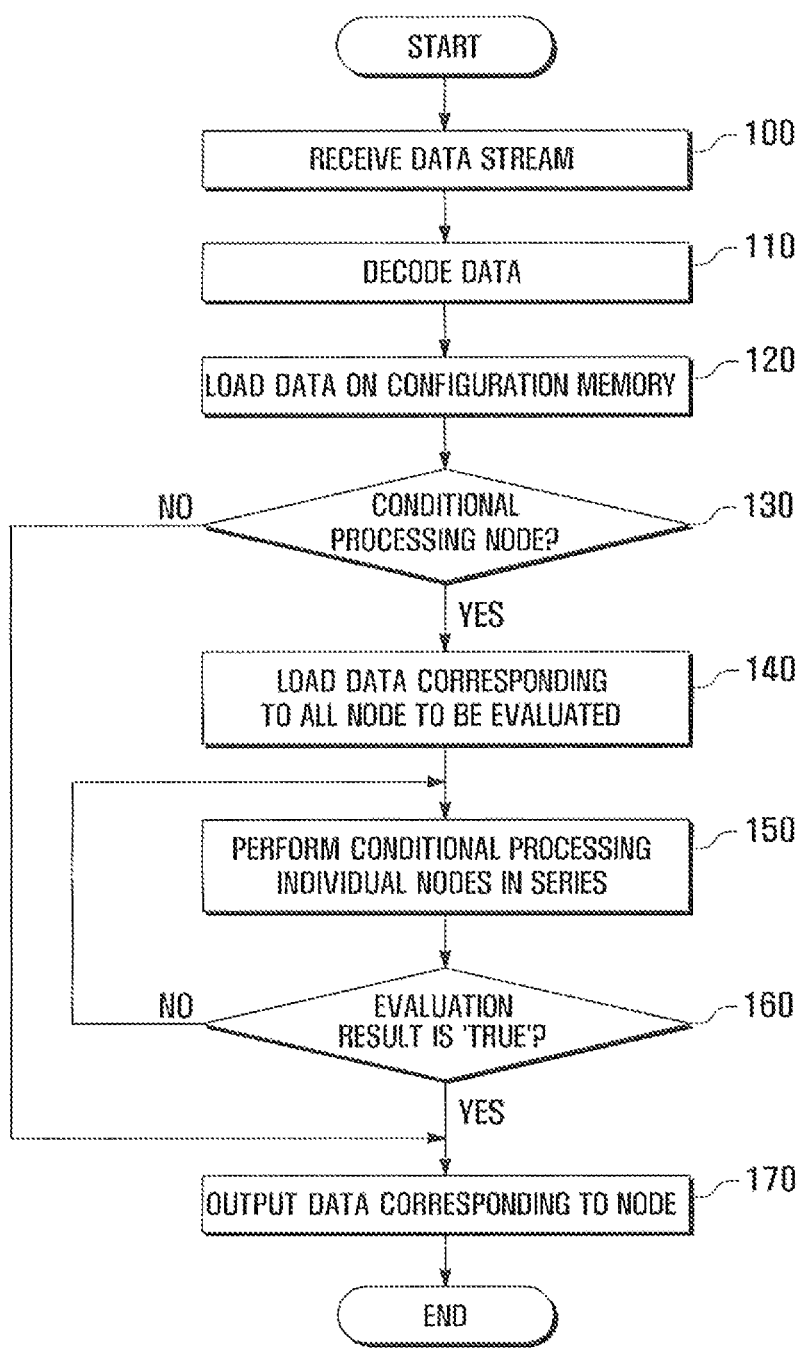
FIG. 1 is a flowchart illustrating a procedure of a conditional processing at a UE received data with a conventional declarative description language.
Figure 2:
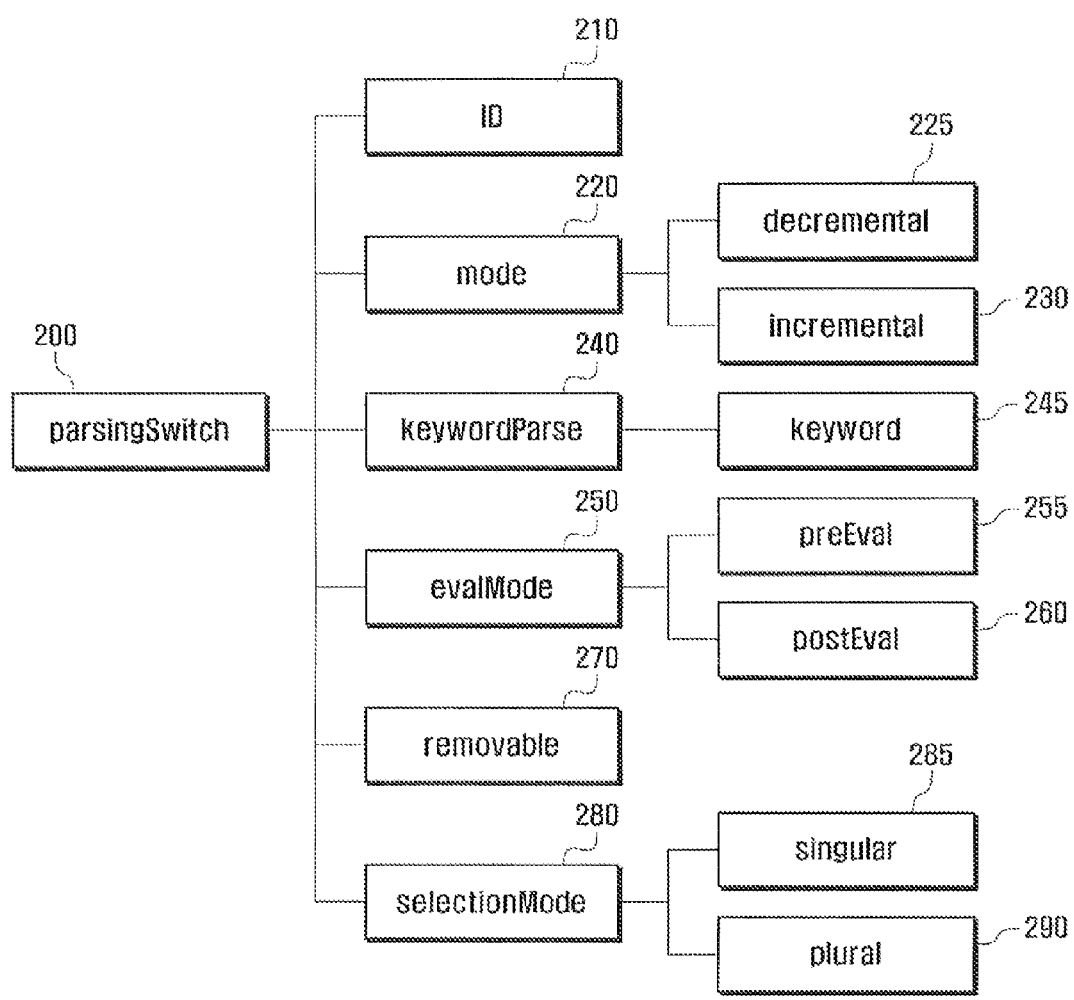
FIG. 2 is a block diagram illustrating a configuration of a parsing switch node for a conditional processing method according to an embodiment of the present invention.

FIG. 2 is a block diagram illustrating a configuration of a parsing switch node for a conditional processing method according to an embodiment of the present invention.

In FIG. 2, the nodes included in the conditional processing information of the parsing switch node as the node type for performing the conditional function in data parsing process are depicted.

In an embodiment of the present invention, the conditional processing information can be the attributes of the parsing switch node and can include evaluation target, evaluation time, evaluation order, evaluation method, etc., for the recipient terminal to execute the conditional processing function.

In the data parsing process, the service data is loaded in the memory in a sequential order as proposed in Table 1 and FIG. 2 or in order of priority. This can provide the terminal with an efficient memory management function for the scene composition.

The aforementioned conditional processing determines whether to load the data for scene composition in the memory represented as a configurator and is performed in top-down manner or a bottom-up manner.

Referring to FIG. 2, the information transported from the parsing switch node 200 represents the attributes of the parsing switch node 200 and includes a parsing node ID field 210, a mode field 220, a keyword parse (keywordParse) field 240, an evaluation mode (evalMode) field 250, a removable field 270, and a selection mode (selectionMode) field 280.

The parsing node ID field 210 contains an identifier for identifying the parsing switch node 200.

The mode field 220 expresses the parsing mode of the conditional processing function of the parsing switch. The mode field 220 includes a decremental field 225 which means stop searching for remaining downward nodes as the targets of the conditional processing when a node evaluated as 'true' appears, and an incremental field 230, which means continuing the conditional processing even when a node evaluated as 'true' appears and stopping the conditional processing search for the downward nodes of the corresponding node and the remaining downward nodes as the targets of the conditional processing when a node evaluated as 'false' or set not to be executed during the execution time of the corresponding service appears.

The keyword parse field 240 indicates performing the conditional processing on the downward nodes having a specific keyword. The keyword parse field 240 can include a keyword field 245 indicating the keyword of the target node to which the conditional processing is performed.

The evaluation mode field 250 includes the information about the timing of the evaluation on the condition for performing the conditional processing function. The evaluation mode field 250 includes a pre-evaluation (preEval) field 255 for evaluating the target node before it is loaded in the memory, i.e. evaluating the target node only with the information on its attributes, and a post-evaluation (postEval) field 260 for evaluating the target node after all the nodes as the targets of the conditional processing are loaded in the memory.

The removable field 270 indicates whether to unload or delete the node evaluated as 'false' or configured not to execute during the execution time of the corresponding service among the down nodes as the targets of the evaluation from the memory.

The selection mode field 280 indicates a number of selectable downward nodes among the downward nodes as the evaluation targets of the conditional processing. The selection mode field 280 includes a singular field 285 which indicates to stop searching for the remaining downward nodes as the targets of the conditional processing when a node evaluated as 'true' appears while the parsing switch node 200 evaluates the nodes and a plural field 290 which indicates continuing the conditional processing to search for the node having 'true' even when a node evaluated as 'true' appears while the parsing switch node 200 evaluates the nodes.

Table 1 shows the descriptions of the attributes that can be included in the parsing switch node 200.

TABLE 1

| | ID | | Unique ID field |
|---|---|---|---|
| parsingSwitch | Mode | decremental | Indicate to Stop searching for the remaining downward nodes as the targets of the conditional processing when a node evaluated as 'true' appears. |
| | | incremental | Indicate Continuing the conditional processing even when a node evaluated as 'true' appears and stopping the conditional processing search for the downward nodes of the corresponding node and the remaining downward nodes as the targets of the conditional processing when a node evaluated as 'false' or set not to be executed during the execution time of the corresponding service appears |
| | keywordParse | keyword | Indicate the keyword of the target node to which the conditional processing is performed. |
| | evalMode | preEval | pre-evaluation (preEval) field for evaluating the target node before it is loaded in the memory |
| | | postEval | Evaluate the target node after all the nodes as the targets of the conditional processing are loaded in the memory |
| | | removable | Indicate unloading or deleting the node evaluated as 'false' or configured not to execute during the execution time of the corresponding service among the down nodes as the targets of the evaluation from the memory |
| | selectModec | singular | Indicate to stop searching for the remaining downward nodes as the targets of the conditional processing when a node evaluated as 'true' appears while the parsing switch node evaluates the nodes |

TABLE 1-continued

| ID | | Unique ID field |
|---|---|---|
| | plural | Indicate continuing the conditional processing to search for the node having 'true' even when a node evaluated as 'true' appears while the parsing switch node evaluates the nodes |

Although not listed in Table 1, the parsing switch node 200 can include fields that belongs to the nodes performing the conventional conditional processing functions, and this follows the normal case of the declarative description language. For instance, XML language type, i.e., a representative declarative description language, is composed of metadata and defines the document structure in mark-up format. Accordingly, the data structure, meaning, and presentation information are split such that a node value is expressed with the elements and attributes. That is, a node becomes an element by mapping the node values of Table 1 and their field values to the XML language type, and the respective field values correspond to the definitions on the attributes of the element. The attributes expressing an element can be can be represented by one or more among the attributes as defined in Table 1 depending on the data.

A conditional processing method using the parsing switch according to an embodiment of the present invention is described hereinafter.

LASeR is a technology for expressing rich media using a declarative description language. In an embodiment of the present invention, parsingSwitch node is defined as a new node type of the LASeR, and a conditional processing method using the parsingSwitch node is described in detail.

In an embodiment of the present invention, the conditional processing method is described with the operations of the terminal equipped with a Rich Media Engine (RME) based on the declarative description language, i.e. LASeR engine. However, the conditional processing method can also be applied to the terminals operating with the RMEs based on other declarative description languages. Although the conditional processing method is described with the terms and elements specified in LASeR standard, it is obvious to those skilled in the art that the terms and elements constituting the engine, system, and data can be changed when another RME or system other than LASeR is adopted.

Table 2 shows an example of the parsingSwitch node for the conditional processing according to an embodiment of the present invention.

TABLE 2

...
<parsingSwitch mode = "decremental" removable = "true" evalMode = "postEval" ...>
    <g id = "condition01"> ... </g>
    <g id = "condition02"> ... </g>
    <g id = "condition03"> ... </g>
</parsingSwitch>
    ...

Referring to Table 2, the parsingSwitch node and the fields corresponding to the information carried by the parsingSwitch node are described as new LASeR elements and attributes.

Here, the element is a basic unit of an object constituting a scene in the scene composition control technology such as LASeR, and the attribute is a property of an element constituting the scene.

In Table 2, 'g' elements having the id attributes of 'Condition01', 'Condition02', and 'Condition03' are the downward nodes as the evaluation target of the conditional processing of the parsingSwitch. Here, the 'g' element is a container element for grouping together related elements.

Accordingly, various scene component elements composing a content can be nested in the 'g' element. Here, the component elements include graphics elements such as a 'rect' element for drawing a rectangle and a 'circle' element for drawing a circle, and scene component elements of audio, video, and image.

These elements create the subject of a scene constituting a screen image. In Table 2, "<g id="Condition01"> . . . scene composition (subject of scene) . . . </g>" is an attribute, and the data placed between the tags <g> and </g> is the subject of the scene composition. For instance, the element is a circle, the circle as the subject is drawn on the screen. The element as the subject composing a scene can be a red circle, a blue circle, a large circle, or a small circle.

When the parsingSwitch node "<parsingSwitch mode="decremental" removable="true" evalMode="postEval" . . . > . . . evaluation target element groups </parsingSwitch>" as shown in Table 2, the recipient terminal operates as follows:

First, if a node evaluated as 'true' according to the value of the decremental field of the mode field appears, the terminal stops searching for the remaining downward nodes as the target of the conditional processing.

Second, the terminal unloads or deletes the node evaluated as 'false' according to the value of the removal field (removable="true") or configured not to execute during the execution time of the corresponding service among the down nodes as the targets of the evaluation from the memory.

Third, the terminal evaluates a node after the target node is loaded on the memory according to the post evaluation field of the evaluation field (evalMode="postEval").

Using the aforementioned information elements, the terminal performs conditional processing to the elements described in table 2 (<g id="Condition01"> . . . </g>, <g id="Condition02"> . . . </g>, and <g id="Condition03"> . . . </g>) and provides the user the element selected among them. The term "element" used in Table 2 can be used interchangeably with the term "node".

A conditional processing method using a parsing switch node is described with another example hereinafter. Table 3 shows another example of the parsingSwitch node for the conditional processing method according to an embodiment of the present invention.

TABLE 3

...
<parsingSwitch mode = "incremental" removal = "true" evalMode = "postEval" ...>
    <g id = "Condition01" memory = "..."> ... </g>
    <g id = "Condition02" memory = "..."> ... </g>

TABLE 3-continued

```
    <g id = "Condition03" memory = "..."> ... </g>
</parsingSwitch>
...
```

Table 3 shows an exemplary parsingSwitch node with which the terminal references the information on the memory amount (memory=" . . . "), as a criterion for the conditional processing, required for parsing the down nodes (child nodes of the parsing switch node) or elements as the evaluation targets of the conditional processing of the parsing switch node and determines a node to use for servicing to the scene among the downward nodes (child nodes of the parsing switch node) as the evaluation targets of the conditional processing.

Although not described, the amount of memory required for processing the node (or element) can be expressed as the memory required to load the respective nodes constituting the parse tree and sub-elements for presenting the scene component elements, the entire amount of memory, or the amount of memory required for servicing the scene.

If the mode field of the parsingSwitch node is the decremental field, the child nodes of the parsingSwitch can be listed in decreasing order with respect to their memory requirements.

In this case, the terminal evaluates the conditional processing target node appropriate for the current memory status and loads, if there is a node evaluated as 'true', loads the corresponding node on the memory and stops conditional processing within the parsingSwitch node.

In contrast, if the mode field of the parsingSwitch node is the incremental field, the child nodes of the parsingSwitch can be listed in increasing order with respect to their memory requirements.

When a conditional processing evaluation target node inappropriate for the current memory status is encountered, the terminal stops loading the downward nodes of the conditional processing node in the memory and ends the conditional processing within the parsingSwitch node. That is, if a specific parsingSwitch node is evaluated as 'false', the downward nodes of the parsingSwitch node are not loaded in the memory, and thus the conditional processing within the parsingSwitch node is terminated.

Structures of a transmitter and a receiver for performing the conditional processing according to an embodiment are described hereinafter. The description is focused on the parts related to the conditional processing to avoid the subject matter of the present invention from being obscured by the exaggerated explanation on the unrelated parts.

Figure 3:
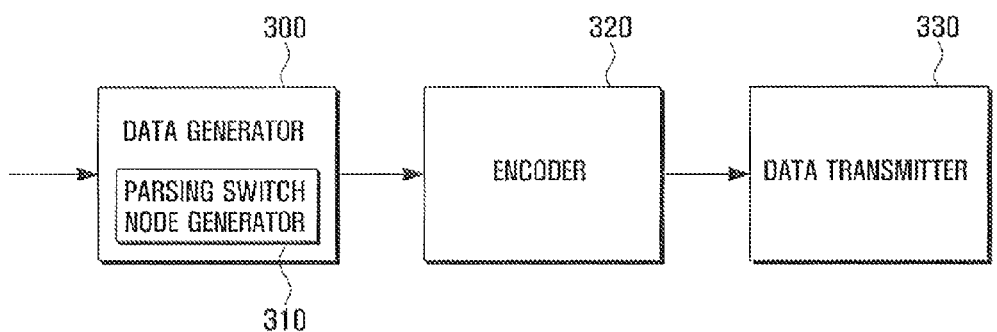
FIG. 3 is a block diagram illustrating a transmitter for a conditional processing method according to an embodiment of the present invention.

A structure of a transmitter according to an embodiment of the present invention is described first. FIG. 3 is a block diagram illustrating a transmitter for a conditional processing method according to an embodiment of the present invention.

As illustrated in FIG. 3, the transmitter includes a data generator 300, an encoder 320, and a data transmitter 330.

The data generator 300 generates a declarative description language-based data which includes the parsing switch (parsingSwitch) node according to an embodiment of the present invention. Particularly, the data generator 300 includes a parsing switch node generator 310 which is responsible for generating the parsing switch node. The parsing switch node 310 includes at least one attribute containing conditional information as descried with reference to Table 1.

The encoder 320 encodes the data output from the data generator 300. The encoded data is output to the data transmitter 330, and the data transmitter 330 transmits the data to a receiver.

Figure 4:
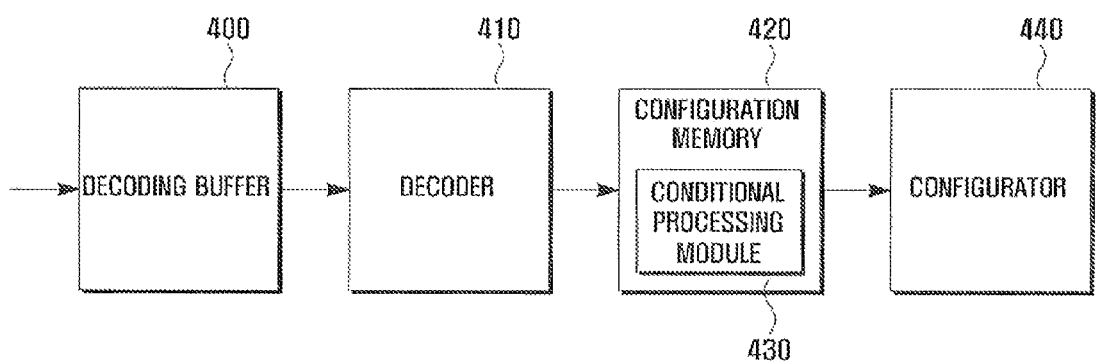
FIG. 4 is a block diagram illustrating a receiver for a conditional processing method according to an embodiment of the present invention.

A structure of a receiver according to an embodiment of the present invention is described hereinafter. FIG. 4 is a block diagram illustrating a receiver for a conditional processing method according to an embodiment of the present invention.

As illustrated in FIG. 4, the receiver includes a decoding buffer 400, a decoder 410, a configuration memory 420, and a configurator 440.

Once the data having a plurality of nodes structured based on the declarative description language is received, the decoding buffer 400 buffers the input data and outputs the data to the decoder 410. The decoder 410 decodes the data input from the decoding buffer 400 and outputs the decoded data to the configuration memory 420. The configuration memory 420 splits the component elements of the data into meaningful tokens and develops a parse tree having a hierarchical relationship among the tokens.

Particularly, the decoder 410 analyzes the information (attributes) of the fields constituting the parsing switch (parsingSwitch) node and outputs the child nodes (downward nodes) of the parsing switch node as evaluation targets to the configuration memory 420. At this time, different nodes can be loaded on the configuration memory depending on the conditional processing information described with reference to Table 1.

The configuration memory 420 forms a parse tree using the nodes constituting the data and evaluates, when the corresponding node is a parsing switch node, the child nodes of the parsing switch node while forming the parse tree. The evaluation can be performed based on the criteria of the attributes of the parsing switch node. For this purpose, the configuration memory 420 is provided with a conditional processing module 430, which evaluates whether a node is a required 'goal' or an executable node. That is, the configuration memory 420 performs conditional processing by means of the conditional processing module 430.

When the evaluation result is 'true', the node is output to the display by means of the configurator 440.

When it is determined to evaluate the target nodes on a one-by-one basis with the information on the attributes of the evaluation nodes as the evaluation targets before loading the subject of the downward nodes group according to the result of the analysis on information of the individual fields constituting the parsing switch node, the data (subject) constituting the node evaluated as 'true' is loaded in the memory 420. Also, all the information composed in the form of the parse tree within the configuration memory 420 is output to the display through the configurator 440.

In short, the child nodes of the parsing switch node as the evaluation targets are loaded on the configuration memory 420 in sequential order according to the evaluation mode (evalMode). The evaluation target nodes of the configuration memory are downward nodes (child nodes) of the parsing switch node, and the downward nodes are regarded as parts of the parsing switch node. When the evaluation mode (evalMode) is the pre-evaluation (preEval), the attributes are loaded first. When the evaluation mode (evalMode) is the post evaluation, the subject, i.e. the actual data constituting the evaluation target nodes, are loaded.

The configuration memory 420 can evaluate the attributes of the loaded node (preEval) or the subject (node) of the node (postEval) depending on the evaluation mode (evalMode) of the evaluation information. In the case where the evaluation result is 'true', the corresponding node is loaded in the configuration memory 420. If the evaluation result is 'false', the corresponding node is not loaded in the configuration memory 420 or, when loaded already, the corresponding node is deleted from the configuration memory 420.

The configurator 440 outputs the input node in the format available for providing to the user. In case of a node generating visual data, the configurator 440 outputs the node to the display. At this time, the configurator 440 can be implemented as a reproducer depending on the attributes of the node.

For instance, when a node has an attribute to render a circle, the configurator 440 can provide the analog signals of R, G, and B signals and display position such that a circle can be drawn on the display device.

The function block called configuration memory in an exemplary embodiment of the present invention can be referred to by different names depending on the program execution engine or Rich Media Engine (RME) if they operate in the same manner as the configuration memory. For instance, the configuration memory can be referred to as a "scene tree manager" or "Document Object Model (DOM) tree configurator." Also, when the data is transmitted by the transmitter without an encoding process, the decoding process can be omitted at the receiver.

The conditional processing on the parsing switch node at the transmitter and receiver is described hereinafter. As aforementioned, the transmitter generates and transmits the data having the parsing switch node for performing the conditional processing function on the basis of the declarative description language. The conditional processing method of the receiver on the declarative description language-based data is described hereinafter.

Particularly, the conditional processing method based on the evaluation mode (pre-evaluation and post evaluation) is described.

It is assumed that there are nodes (elements) A, B, and C having the attributes related to the memory requirements. Here, the subject of the node (element) A includes video and audio, and the subject of the node B includes graphics elements such as a circle and a rectangle, and the subject of the node C includes text.

If the evaluation mode (evalMode) field of the parsing switch node is set to 'pre-evaluation', the receiver loads only the attributes of the individual nodes that are related to the memory requirements and evaluates the corresponding nodes. If the attribute related to the memory requirement of the node A fulfills the current memory status of the receiver so as to be evaluated as 'true', the receiver loads the video and audio data of the node (element) A is the configuration memory 420 and outputs the video and audio data in the user-friendly format by means of the configurator 440. If the mode field (Mode) of the corresponding parsing switch node is set to 'decremental', the receiver does not evaluate the nodes B and C.

If the evaluation mode (evalMode) field of the parsing switch node is set to 'post evaluation', the receiver loads the video and audio data of the node A in the configuration memory 420 and evaluates the data. If the mode (Mode) field of the parsing switch node is set to 'decremental', the receiver does not evaluate the nodes B and C.

Unlike the conventional method in which all the nodes are loaded on the memory while the parser develops a parse tree, the conditional processing method of the present invention allows the parser to conditionally load the nodes. For this purpose, the parser has to determine whether the data includes a parsing switch node for the convention processing proposed in the present invention.

A conditional processing method according to an embodiment of the present invention is described hereinafter.

Figure 5:
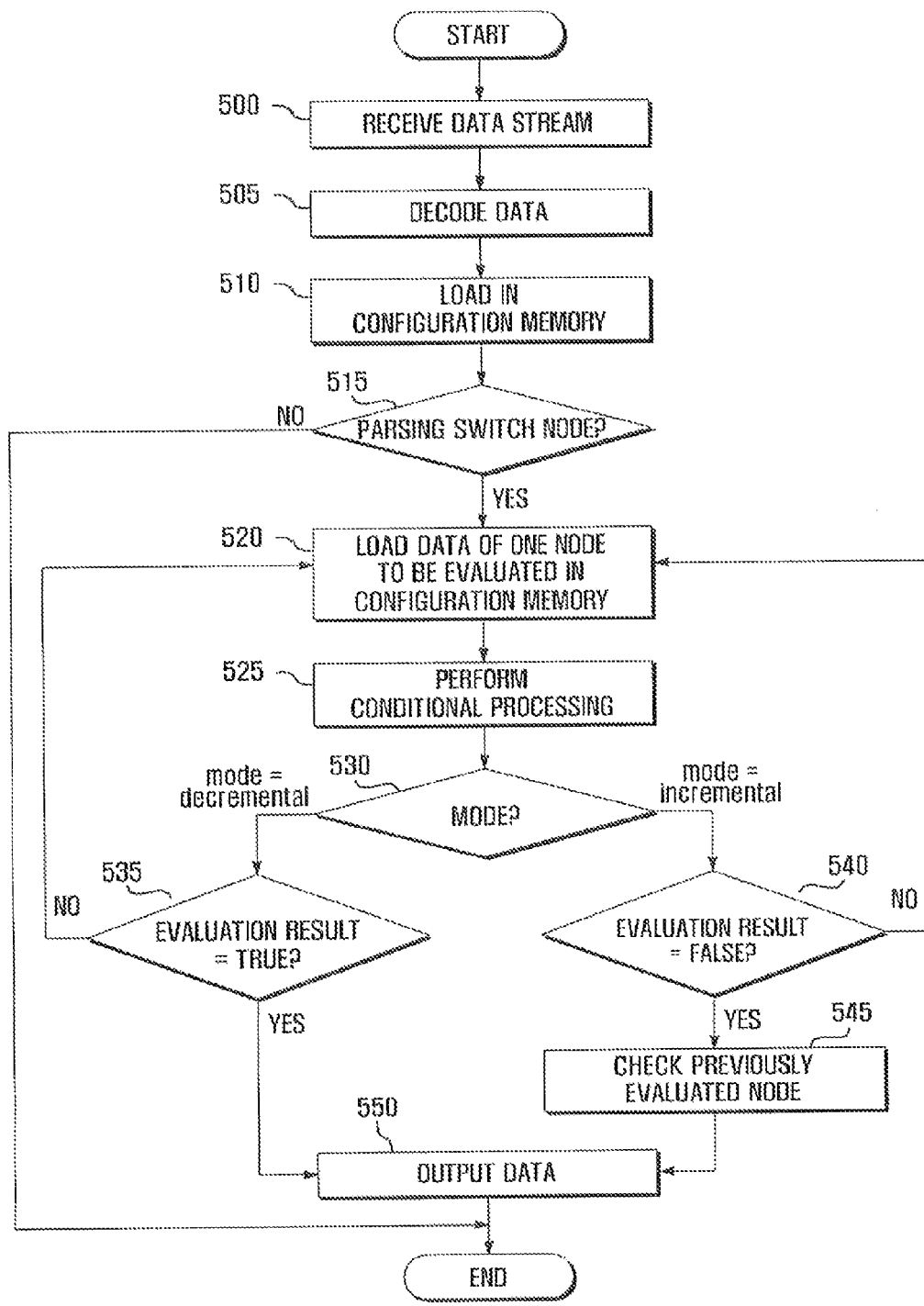
FIG. 5 is a flowchart illustrating a conditional processing method according to an embodiment of the present invention.

FIG. 5 is a flowchart illustrating a conditional processing method according to an embodiment of the present invention.

It is assumed that the conditional processing procedure is performed when the evaluation mode (evalMode) field of the parsing switch node is set to 'post evaluation' (postEval) or after the scene component data as the evaluation targets of the conditional processing of the parsing switch node are loaded in the memory.

Referring to FIG. 5, the receiver receives a data stream including a plurality of nodes (elements) that are structured based on a declarative description language in step 500. The received data is input to the decoding buffer 400 and output to the decoder 410 in series. The receiver decodes the data by means of the decoder 410 in step 505. The receiver loads the decoded data in the configuration memory 420 in sequential order in step 510. The components of the decoded data are split into tokens. Next, the receiver analyzes hierarchical relationship of the components and develops a parse tree according to the hierarchical relationship.

The receiver generates the parse tree by loading the decoded data and determines whether a parsing switch node is detected in step 515 while generating the parse tree.

If a parsing switch node is detected, the receiver analyzes all the attributes of the parsing switch node and loads the child nodes of the parsing switch node, as the targets of the evaluation, in the configuration memory 420 in series in step 520.

In step 525 the receiver evaluates the evaluation target node loaded in the configuration memory 420. That is, the receiver performs conditional processing. The conditional processing is a procedure to determine whether the node fulfills the attributes of the parsing switch node. If the corresponding node fulfills the attributes of the parsing switch node, it is evaluated as 'true' and, otherwise, 'false'. Although the attributes of the parsing switch node are the representative evaluation criteria, other attributes can be used as the evaluation criteria. First, whether the evaluation target node is successfully loaded in the configuration memory 420 can be included in the evaluation criteria. Second, the attributes and characteristics of the evaluation target node can be included in the evaluation criteria. Third, both whether the evaluation target node is successfully loaded on the configuration memory 420 and the attributes and characteristics of the evaluation target node can be included in the evaluation criteria.

For instance, the receiver loads the first child node (element) of the parsing switch node in the configuration memory 420 and evaluates whether the child node is a required 'goal' or an executable node.

At this time, all the child nodes (elements) of the parsing switch node can be determined as parsing switch nodes.

In step 530, the receiver determines whether the mode field of the corresponding parsing switch node is set to 'decremental' or 'incremental' in. If the mode field of the parsing switch node is set to 'decremental', the procedure goes to step 535 and, otherwise, if the mode field is set to 'incremental', the procedure goes to step 540. This means selecting the processing method depending on the mode rather than checking the mode at step 530.

If the value of the mode field, which carries one of the attributes of the switching node, indicates the decremental field, the receiver determines whether the evaluation result is 'true' in step 535.

If the evaluation result is 'true', the receiver controls such that the configuration memory 420 outputs the node evaluated as 'true' to the configurator 440 so as to be displayed in step 550. That is, the configurator 440 outputs the node evaluated as 'true' in the form of the user-viewable format. For instance, if the node is the one for drawing a circle, the configurator 440 outputs the analog signals including R, G, and B and the position information such that a circle is drawn on the display device.

Otherwise, if the evaluation result is 'false' at step 535 or the node is set so as not to be executed during the execution time of the corresponding service, the process goes to step 520 such that the receiver loads the next node following the node evaluated as 'false' in the configuration memory 420. For instance, if the first child node is evaluated as 'false' or set so as not to be executed during the execution time of the corresponding service, the receiver loads the second child node in the configuration memory 420.

If at least one node evaluated as 'true' appears according to the analysis results on the information of the individual fields constituting the parsing switch node, the evaluation on the rest child nodes may not be performed.

When the value of the mode field of the parsing switch node indicates the decremental field, the receiver determines whether the evaluation result is 'true' at step 535. If the evaluation result is 'true', the receiver controls such that the configuration memory 420 outputs the node to the configurator 440 to display the data corresponding to the node. At this time, the remaining evaluation target nodes of the parsing switch node are not processed. That is, the remaining evaluation target nodes are not loaded as well as not evaluated.

When the value of the mode field of the parsing switch node indicates the incremental field, the receiver determines whether the evaluation result is 'false' at step 540.

If the evaluation result is 'true', the process goes to step 520 such that the receiver checks the next node. Otherwise, if the evaluation result is 'false' or the node is set so as not to be executed during the execution time of the corresponding service, i.e. the evaluation result is not 'true', the receiver controls such that the configuration memory 420 outputs the previously evaluated node, i.e. the node evaluated right before the currently evaluated node, to the display via the configurator 440.

Particularly when the node is evaluated as 'false' or set so as not to be executed during the execution time of the corresponding service, it can be removed according to the value of the removable field transported through the parsing switch node.

The other evaluation target nodes excluding the node evaluated currently as 'false' and the previous node displayed can be removed from the configuration memory 420 according to the removal field transported through the parsing switch node. For instance, if a node 4 among the nodes 1, 2, 3, 4, and 5 is evaluated as 'false', only the node 3 is loaded in the configuration memory 420 so as to be output via the configurator 440. At this time, the nodes 1 and 2 can be removed along with the node 4.

Also, it is possible to release the configuration memory 420 by removing the removal target node whenever the evaluation is done in such a manner that, when the nodes 1 and 2 are evaluated as 'true', the node 1 is removed.

In another system configured to retain the nodes evaluated as 'true' even when at least one of the evaluation target nodes of the conditional processing, i.e. the child nodes of the parsing switch node, is selected, if the node 4 is evaluated as 'false', the nodes 1, 2, 3, and 4 are retained in the configuration memory 420 while the node 3 is output through the configurator 440.

A conditional processing method according to another embodiment of the present invention is described hereinafter.

Figure 6:
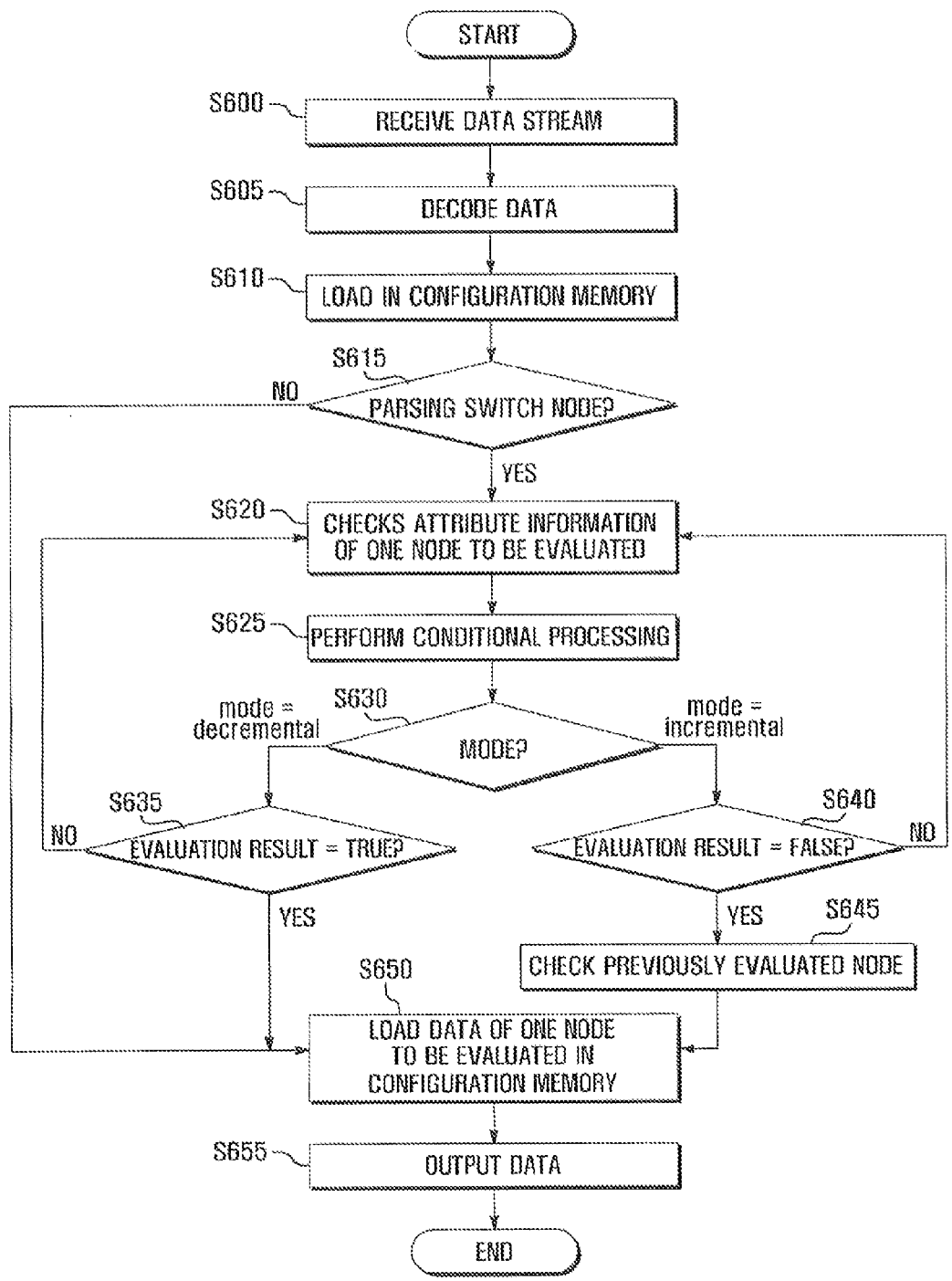
FIG. 6 is a flowchart illustrating a conditional processing method according to another embodiment of the present invention.

FIG. 6 is a flowchart illustrating a conditional processing method according to another embodiment of the present invention.

In the embodiment of FIG. 6, it is assumed that the evaluation mode (evalMode) of the conditional processing procedure for the parsing switch node is set to pre-evaluation (preEval) or the conditional processing for the parsing switch node is performed before loaded in the memory, i.e. the conditional processing is performed only with the information on the attributes and characteristics of the evaluation target nodes as the evaluation criteria.

Referring to FIG. 6, the receiver receives a data stream having a plurality of nodes (elements) structured on the basis of a declarative description language in step 600. The received data is input to the decoding buffer 400 and output to the decoder 410 in series. The receiver decodes the data output by the decoding buffer 400 by means of the decoder 410 in step 605. In step 610, the receiver loads the data decoded by the decoder 410 in the configuration memory 420. At this time, the components of the decoded data are split into meaning tokens. The receiver analyzes hierarchical relationship of the components and develops a parse tree according to the hierarchical relationship.

The receiver generates the parse tree by loading the decoded data and determines whether a parsing switch node is detected in step 615 while generating the parse tree.

If a parsing switch node is detected, the receiver analyzes all the attributes of the parsing switch node and loads only the attributes of the evaluation target nodes in the configuration memory 420 before loading the entire data constituting the downward nodes (child nodes of the parsing switch node) as the evaluation targets in step 620.

In step 625, the receiver evaluates the nodes (child nodes of the parsing switch node) in series with their attributes loaded in the configuration memory.

In step 630, the receiver determines whether the mode field of the parsing switch node is set to 'decremental' or 'incremental'. If the mode field of the parsing switch node is set to 'decremental', the process goes to step 635. Otherwise if the mode field of the parsing switch mode is set to 'incremental', the process goes to step 640. This means that selecting the processing method depending on the value of the mode field rather than checking the mode at step 630.

When the value of the mode field of the parsing switch node is set to 'decremental', the receiver determines whether the evaluation result is 'true' in step 635. That is, the receiver determines whether the node fulfills the attribute of the parsing switch node. If the evaluation result is 'true', the receiver loads the node evaluated as 'true' in the configuration memory 420. This means that the subject of the node evaluated as 'true' is loaded in the configuration memory 420.

Otherwise, if the evaluation result is 'false' or indicates that the node is set so as not to be executed during the execution time of the corresponding service, i.e. if the evaluation result is not 'true', the process goes to step 620 and thus the receiver loads the attributes of the next node following the node evaluated not 'true' in the configuration memory 420.

For instance, when the first child node of the parsing switch node is evaluated as 'false' or set so as not to be executed during the execution time of the corresponding service, the attributes of the second child node is loaded in the configuration memory 420.

Particularly, the node evaluated as 'false' or set so as not to be executed during the execution time of the corresponding service can be removed according to the value of the removable field transported via the parsing switch node. Also, when at least one node evaluated as 'true' appears from the analysis results on the information of individual fields constituting a parsing switch transported through the parsing switch node, the remaining downward nodes, i.e. the remaining child nodes of the parsing nodes, may not be evaluated.

When the value of the mode field of the parsing switch node is set to 'incremental', the receiver determines whether the evaluation result is 'false' in step 640.

If the evaluation result is 'true', the process goes to step 620 such that the receiver checks the next node. Otherwise, if the evaluation result is 'false' or the node is set so as not to be executed during the execution time of the corresponding service, i.e. the evaluation result is not 'false', the receiver checks the previously evaluated node in step 645 and controls such that the previous node, i.e. the node evaluated right before the current node, is loaded in the configuration memory 420 in step 645. That is, the receiver loads the subject of the node evaluated as 'true' based on the attribute values on the configuration memory 420.

Consequently, in step 655, the receiver outputs the nodes evaluated as 'true' and thus loaded on the configuration memory 420 to the display via the configurator 440.

In an exemplary system configured to load the node evaluated as 'true' in the configuration memory, the receiver outputs the node evaluated as 'true' and loaded in the configuration memory lastly to the display via the configurator without loading the subject of the node evaluated as 'false'.

The nodes excluding the current node evaluated as 'false' and the currently displayed previous node can be removed from the configuration memory 420 according to the value of the removal field transported through the parsing switch node. For instance, if the node 4 is evaluated as 'false' among the nodes 1, 2, 3, 4, and 5, then only the node 3 is loaded in the configuration memory 420 so as to be output via the configurator 440. At this time, the nodes 1 and 2 can be removed from the configuration memory 420 along with the node 4. Also, it is possible to release the configuration memory 420 by removing the removal target node whenever the evaluation is done in such a manner that, when the nodes 1 and 2 are evaluated as 'true', node 1 is removed.

In another system configured to retain the nodes evaluated as 'true' even when at least one of the evaluation target nodes of the conditional processing, i.e. the child nodes of the parsing switch node, is selected, if the node 4 is evaluated as 'false', the nodes 1, 2, 3, and 4 are retained in the configuration memory 420 while the node 3 is output through the configurator 440.

The different conditional processing procedures of the parsing switch node according to the embodiments of the present invention are described hereinabove. The values of the fields of the parsing switch node and evaluation criteria for the conditional processing procedure of the present invention can be changed in other embodiments of the present invention. Also, the order of processing steps of the conditional processing procedure can be changed, and other processing steps can be further added to the conditional processing procedure.

Unlike the conventional method for performing the conditional processing on data structured based on the declarative description language in which all the child nodes of a command node (including the nodes that are not output) are loaded in the configuration memory and thus occupy the memory space, the conditional processing method of the present invention is capable of executing the conditional processing function during the data parsing process while loading the nodes (data) necessary for the service in the configuration memory but unloading or removing the nodes unnecessary for providing the service from the configuration memory, thereby reducing unnecessarily occupied memory space. By reducing the resource waste, it is possible to increase the memory recycling rate and reduce the processing burden of the memory-constraint device, resulting in efficient memory management.

The terms such as node, field, element, attribute, and attribute values used in the above descriptions can be replaced by synonymous terms and their derivations that are known or defined in the same meanings. Also, the information carried by individual fields of the parsing switch node that is defined in the present invention can be set to be used as the meaningful information of the parsing switch node itself rather than divided into separate fields.

Also, the information used as the nodes, fields, elements, attributes, and attributes values that are newly introduced in the present invention can reference the internal/external data, files, application programs, and services of the declarative description language-based program execution engine and LASeR. Here, the attributes can be defined in the program execution engine and LASeR to reference the values of these attributes, the attributes themselves can be defined in the form of other data, file, application program, and service to reference using the elements and attributes having reference function.

As described above, the conditional processing method and apparatus of the present invention is capable of executing the conditional processing function during the data parsing process while loading the nodes (data) necessary for the service in the configuration memory but unloading or removing the nodes unnecessary for providing the service from the configuration memory, thereby increasing the memory recycling rate and reducing the processing burden of the memory-constraint device, resulting in efficient memory management.

As described above, the attributes and attribute values can be defined in various manner and thus other methods for defining the attributes and values, if used for identical functions and purposes even when referencing the attributes and attribute values using the elements and attributes having the reference function, and can be envisioned by embodiments of the present invention.

Although embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A conditional processing method comprising the steps of:
   receiving a data stream including a plurality of elements;
   decoding the received data stream;
   generating a parse tree by loading the decoded data stream;
   determining whether a parsingSwitch element is detected while generating the parse tree; and
   if the parsingSwitch element is detected, loading at least one child element of the detected parsingSwitch element in a memory, based on at least one attribute of the detected parsingSwitch element,
   wherein, when the at least one child element includes a plurality of child elements, loading the plurality of child elements comprises:
   listing the plurality of child elements of the parsingSwitch element in a decreasing order with respect to respective memory requirements of the plurality of child elements, when a mode attribute of the detected parsingSwitch element is decremental; and loading a first child element among the listed the plurality of child elements, when the first child element fulfills a current memory status in the memory.

2. The conditional processing method of claim 1, further comprising outputting an element retained in the memory.

3. The conditional processing method of claim 1, wherein the plurality of child elements are structured based on a declarative description language.

4. A conditional processing apparatus, comprising:
a decoder that decodes a data stream including a plurality of elements;
a configuration memory; and
a processor that
generates a parse tree by loading, in the configuration memory, the decoded data stream,
determines whether a parsingSwitch element is detected, and
loads at least one child element of a detected parsingSwitch element based on at least one attribute of the detected parsingSwitch element, wherein when the at least one child element includes a plurality of child elements, the processor lists the plurality of child elements of the parsingSwitch element in a decreasing order with respect to memory requirements of the plurality of child elements, when a mode attribute of the detected parsingSwitch element is decremental, and wherein the processor loads a first child element among the listed the plurality of child elements, when the first child element fulfills a current memory status in the configuration memory.

5. The conditional processing apparatus of claim 4, wherein the processor outputs an element retained in the configuration memory.

6. The conditional processing apparatus of claim 4, wherein the plurality of child elements are structured based on a declarative description language.

* * * * *